United States Patent [19]

Sauer

[11] 3,980,619

[45] Sept. 14, 1976

[54] POLYESTERIFICATION
[75] Inventor: Robert J. Sauer, Granville, Ohio
[73] Assignee: Owens-Corning Fiberglas Corporation, Toledo, Ohio
[22] Filed: Aug. 23, 1974
[21] Appl. No.: 499,874

[52] U.S. Cl. ............................................ 260/75 H
[51] Int. Cl.² .......................................... C08G 63/68
[58] Field of Search ................ 260/75 H, 75 M, 869

[56] References Cited
UNITED STATES PATENTS

| | | | |
|---|---|---|---|
| 3,519,700 | 7/1970 | Baum | 260/75 H X |
| 3,585,254 | 6/1971 | Buck | 260/75 H X |
| 3,697,625 | 10/1972 | Smith et al. | 260/75 H X |

*Primary Examiner*—Lucille M. Phynes
*Attorney, Agent, or Firm*—John W. Overman; Patrick P. Pacella

[57] ABSTRACT

I disclose a process for the production of brominated polyesters. The process is carried out in the presence of toluene to produce a polyester having an acid number less than 100. A toluene/water azeotrope is formed which reduces the loss of a reactive intermediate that otherwise would be lost during the polyesterification.

7 Claims, No Drawings

POLYESTERIFICATION

This invention relates to a process for producing polyesters.

Polyesters are well known in the art as thermosetting compositions. The automotive industry uses them in molding applications to form fenders, dashboards, and other component parts of automobiles. Glass fiber mats also can be employed with the polyesters to make fiber reinforced plastics.

U.S. Pat. No. 3,697,625 discloses a process for the production of flame-retardant, brominated polyesters. The process uses a dibrominated diacid (or its anhydride) and a diol to produce the polyesters. Ethylene bromohydrin, an intermediate in the reaction, is formed during the polyesterification. Water also is formed. Left to itself, the water forms an azeotrope with the intermediate and causes the loss of the intermediate very early in the process. Commonly, an organic solvent is added to the reaction mixture to form an azeotrope with the water. In the present instance, the organic solvent ties up the water so that it cannot form an azeotrope with the intermediate. The boiling point of the newly formed azeotrope must be lower than the boiling point of the azeotrope of water and the intermediate. Otherwise, loss of the intermediate is not circumvented. Since the water/organic solvent azeotrope is the lowest boiling component of the mixture, its formation prevents the loss of the intermediate.

As high a boiling azeotrope as possible usually is selected to increase the rate of removal of the water. Often, a high boiling azeotrope is useful because no intermediate is present and the water/organic solvent azeotrope is by far the lowest boiling component of the mixture.

I have now discovered that a toluene/water azeotrope, which has a low boiling point of 84°C, does not adversely affect the polyesterification. In fact, the opposite is true.

I can achieve 98% isomerization of the acid or its anhydride even in the presence of this low boiling azeotrope. The likelihood that the water/intermediate azeotrope will form in my process is very low.

The diols of this invention have the formula:

Formula I

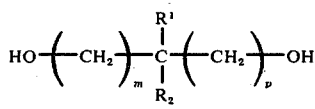

wherein the sum of $m + p$ is at least 1, generally 1 to 20, preferably 4 to 10 and $R^1$ and $R^2$, which can be the same or different, are hydrogen or alkyl and when alkyl, containing one to 20 carbon atoms, preferably one to 10 carbon atoms. Specific compounds include ethylene glycol, propylene glycol, butanediol-1,2, butanediol-1,3, butanediol-1,4, hexanediol-1,6, decanediol-1,10, neopentyl glycol and the like.

Also suitable are the ether diols having the formula:

Formula II

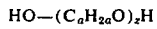

wherein $a$ has a value of at least 1, preferably 2 to 6, and $z$ has a value of at least 2, preferably 2 to 10. Among compounds falling within the scope of this formula are diethylene glycol, dipropylene glycol, triethylene glycol, tetraethylene glycol, and the like.

Also suitable are the polyalkylene glycols such as polyethylene glycol and polypropylene glycol, having molecular weights ranging from about 1,100 to about 20,000.

The diols are reacted with diacids or their anhydrides. Specific examples include iso-dibromosuccinic acid, dibromohexahydrophthalic acid and their anhydrides. The ring portion of the phthalic acid or anhydride can be methyl substituted.

The dibrominated compounds are known compounds and can be prepared by reacting a mixture containing equal amounts of bromine and the desired acid or anhydride.

In conducting the reaction between the brominated compounds and the desired diol, the diol is used in at least stoichiometric amounts, generally at least about one present in excess of the stoichiometric amount and preferably about one percent to about 10 percent in excess of the stoichiometric amount.

Illustrative of suitable unsaturated polycarboxylic acids which can be used with the brominated materials to produce the polyesters of this invention are those having the formula:

Formula VII

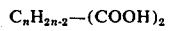

wherein $n$ is an integer having a value of 2 to 20, preferably 2 to 10. Among such acids can be noted fumaric acid, maleic acid, glutaconic acid, citraconic acid, itaconic acid, ethidenemalonic acid, mesaconic acid, allylmalonic acid, propylidenemalonic acid, hydromuconic acid, pyrocinchonic acid, allyl succinic acid, carbocaprolactonic acid, teraconic acid, xeronic acids, cetymalonic acid, and other like ethylenically unsaturated acids.

Other suitable unsaturated acids include 4-amyl-2,5-heptadienedioic acid, 3-hexynedioic acid, tetrahydrophthalic acid, 3-carboxy cinamic acid, and the like.

If desired, the acid anhydrides of these acids can be used per se or in admixture with the acids.

Also, if desired, aromatic polycarboxylic acids, saturated polycarboxylic acids, anhydrides thereof or monocarboxylic acids can be used, in conjunction with the unsaturated polycarboxylic acids or the anhydrides thereof and the brominated materials, to produce the polyesters of this invention.

Illustrative of saturated polycarboxylic or aromatic polycarboxylic acids include, among others, phthalic acid, hexahydrophthalic acid, tetrachlorophthalic acid, succinic acid, adipic acid, suberic acid, azelaic acid, sebacic acid, and the like.

The presence of maleic acid, tetrahydrophthalic acid and anhydrides thereof in the reaction mixture can be effected by formulating a mixture containing the above-noted materials and brominating only a portion thereof.

The polyesters of this invention can be used in urethane resins and in vinyl resins such as poly(vinyl chloride) as flame-retardant plasticizers. Also, they can be used to react with diisocyanates to produce polyurethane resins.

In addition, in those instances wherein the polyesters contain unsaturated groups such as maleate or fumarate groups derived from non-halogenated unsaturated polycarboxylic acids, they can be formulated into molding compositions and formed into thermoset products useful in the automotive industry, boat industry, and the like.

In formulating such compositions which are to be used in molding applications, it is customary to admix, with the unsaturated polyesters, the following materials:

1. A polymerizable ethylenically unsaturated monomer which serves to cross-link the unsaturated polyester to a thermoset product.
2. A peroxide which serves to accelerate the cross-linking reaction.
3. Fillers, including fillers which serve as reinforcing agents such as glass fibers.

Illustrative of suitably polymerizable, ethylenically unsaturated monomers are the vinyl monomers having the formula:

Formula VIII

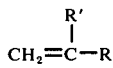

wherein R' is hydrogen halogen or alkyl, i.e., methyl, R is a group having an unsaturated carbon-to-carbon, carbon-to-oxygen, or carbon-to-nitrogen group in conjugation with the vinyl group. Groups having such unsaturation in conjugation with the vinyl group are aryl, ketonic, heterocyclic, nitrile, carbalkoxy, carboxy, and amido.

In addition, if desired, phosphorus containing compounds such as tri(2-chloroethyl)phosphate can be added to the compositions of this invention.

The compositions of this invention can be prepared by mixing the components in a suitable apparatus such as a Cowles dissolver, at temperatures on the order of about 25°C to about 50°C.

Once formulated, the compositions can be formed into thermoset articles of desired shape, particularly thermoset articles such as as automobile fenders, dashboards, building panels, boats, and the like. The actual forming cycle used such as hand lay-up, spray-up and molding using matched metal molds, will vary and depend upon the composition being used and the ultimate article formed.

Suitable molding cycles are conducted at temperatures on the order of 25°F to about 250°F for periods of time ranging from about 0.5 minute to about 5 minutes.

I carry out the process of this invention at a kettle temperature ranging from 84°C to 160°C, preferably 130°C to 160°C. The reaction is carried out in the presence of a sufficient amount of toluene to produce a polyester having an acid number less than 100. Preferably, enough toluene is present to produce a toluene/water azeotrope with all of the water produced by the process. However, partial amounts of toluene can be used if toluene from the cooled distillate is recycled to the reaction kettle. If desired, I can carry out the reaction for an additional time at temperatures above 160°C to lower the acid number of the resulting polyester.

The following example further illustrates my invention:

EXAMPLE

This example illustrates the preparation of a polyester based on a pre-brominated maleic acid anhydride.

a. bromination of maleic acid anhydride

Into preparation reaction flask equipped with a mechanical stirrer, thermometer, condenser, dropping funnel, and gas-inlet tube, there was charged 5.0 moles of maleic acid anhydride and 1.0 moles of phthalic acid anhydride. The mixture anhydride was heated to a temperature of about 135°C and 1.385 moles of bromine were added dropwise into the flask while the contents of the flask were constantly stirred and maintained under a nitrogen gas atmosphere. After the addition of the bromine, the contents of the flask were heated for 1 hour at a temperature of about 135°C. At the end of the 1 hour period, the temperature of the reacted mixture was decreased to about 50°C when the bromine color (dark red) disappeared therefrom indicating completion of the bromination reaction.

b. preparation of the brominated polyester

Into the flask containing the brominated maleic acid anhydride, (a) above, there was added 6.85 moles of ethylene glycol. Toluene (0.95 mole) was added and the mixture was heated for 4 – 4.5 hours while the azeotrope of water and toluene was distilled off and the temperature was raised from 130° to 160°C. Analysis of this sample would indicate an acid number less than 100. Heating continued, but now the pot temperature was increased to 175°C as more toluene/water azeotrope distilled off. This was done for a period of about 2 hours under a nitrogen gas sparge. A sample indicated an acid number of 67. The cook was continued for an additional 1.5 hours under nitrogen at a temperature of 175°C. At the end of this time, the acid number was 63. The run was terminated. Analysis of the distillate by gas chromatography indicated loss of a total of about 0.03 moles of ethylene bromohydrin.

In an analogous polyesterification carried out in the absence of toluene and producing a polyester having an acid value of about 65, analysis of the distillate showed that about .33 moles of ethylene bromohydrin was lost from the product polyester.

Comparable polyesterifications utilizing xylene in place of toluene as the azeotropic soluent lead to appearance of 0.12 to 0.15 moles of ethylene bromohydrin in the aqueous distillate.

The resin may be inhibited with 0.02% (by weight) of toluhydroquinone and diluted with up to 35% styrene to prepare resin suitable for subsequent forming.

In the process described in U.S. Pat. No. 3,697,625, the polyesterification is carried out at temperatures ranging from 165°C to 225°C for a time sufficient to produce a polyester having an acid number of less than 100. The time at these elevated temperatures generally ranged from 5 to 6 hours. In the process of this invention, I reached an acid number below 100 in 4 hours or less without having to heat above 160°C. With additional heating at 175°C, acid numbers in the range of 35 – 55 may be easily achieved.

I intend to include modifications and variations within the scope and spirit of this invention.

I claim:

1. A process for producing a brominated polyester which comprises condensing, at a temperature ranging from 84°C to 160°C, at least a stoichiometric amount of at least one diol and at least one dibrominated diacid or its anhydride wherein the process is carried out in the presence of a sufficient amount of toluene to produce a polyester having an acid number less than 100 and to produce a toluene/water azeotrope with at least a part of the water produced by the process.

2. A process according to claim 1 wherein the amount of toluene is sufficient to form a toluene/water azeotrope with all of the water produced by the process.

3. A process according to claim 1 wherein the diol is ethylene glycol and the diacid is dibrominated maleic acid anhydride.

4. A process according to claim 1 wherein the reaction can be carried out for an additional time at temperatures above 160°C to lower the acid number of the resulting polyester.

5. A process according to claim 1 wherein the process is carried out at a temperature ranging from 130°C to 160°C.

6. A process according to claim 1 wherein the toluene from a cooled distillate is recycled to the process.

7. A process according to claim 3 wherein phthalic acid or its anhydride also is present.

* * * * *